(12) United States Patent
Sawai et al.

(10) Patent No.: US 10,230,089 B2
(45) Date of Patent: Mar. 12, 2019

(54) ELECTROLYTE HOLDER FOR LITHIUM SECONDARY BATTERY AND LITHIUM SECONDARY BATTERY

(75) Inventors: Takehiko Sawai, Mie (JP); Shinji Saito, Mie (JP); Kazunori Urao, Mie (JP); Jyunichi Ushimoto, Kochi (JP); Masahiko Ueta, Kochi (JP); Norihiro Wada, Kochi (JP)

(73) Assignees: SEI CORPORATION, Mie (JP); NIPPON KODOSHI CORPORATION, Kochi (JP)

( * ) Notice: Subject to any disclaimer, the term of this patent is extended or adjusted under 35 U.S.C. 154(b) by 195 days.

(21) Appl. No.: 14/381,542

(22) PCT Filed: Mar. 19, 2012

(86) PCT No.: PCT/JP2012/056998
§ 371 (c)(1),
(2), (4) Date: Aug. 27, 2014

(87) PCT Pub. No.: WO2013/128652
PCT Pub. Date: Sep. 6, 2013

(65) Prior Publication Data
US 2015/0010798 A1    Jan. 8, 2015

(30) Foreign Application Priority Data
Feb. 28, 2012    (JP) .................................. 2012-041928

(51) Int. Cl.
*H01M 2/16*    (2006.01)
*H01M 4/133*    (2010.01)
(Continued)

(52) U.S. Cl.
CPC ....... *H01M 2/1686* (2013.01); *H01M 2/1626* (2013.01); *H01M 2/1653* (2013.01);
(Continued)

(58) Field of Classification Search
CPC ........... H01M 10/0431; H01M 10/052; H01M 10/0525; H01M 10/0566; H01M 10/0585;
(Continued)

(56) References Cited

U.S. PATENT DOCUMENTS 2,734,095 A * 2/1956 Mears et al. ........ H01M 2/1633
162/145
2,942,053 A * 6/1960 Baldwin, Jr. ..... H01M 10/0413
429/118
(Continued)

FOREIGN PATENT DOCUMENTS

| JP | 2007-018861 A | 1/2007 |
| JP | 2007-125821 A | 5/2007 |

(Continued)

OTHER PUBLICATIONS

Machine Translation of: Nagayama et al. (JP 2007/018861A), Jan. 25, 2007.*
(Continued)

*Primary Examiner* — Kenneth J Douyette
(74) *Attorney, Agent, or Firm* — Hedman & Costigan, P.C.; James V. Costigan; Kathleen A. Costigan

(57) ABSTRACT

The present invention provides an electrolyte holder for a lithium secondary battery capable of holding an electrolytic solution inside electrodes or at an interface between the separator and each of the electrodes, preventing electrolyte shortage inside the electrodes, and restraining dendrite from precipitating and growing and also provide the lithium secondary battery, using the electrolyte holder, which is capable of achieving a cycle life to such an extent that the lithium secondary battery can be used for industrial application. An electrolyte holder (3) for use in the lithium secondary battery consists of a multi-layer structure having at least two hydrophilic fibrous layers (A, B) having different porosities. The electrolyte holder (3) is composed of an
(Continued)

electrode group formed by winding a cathode (2) and an anode (1) or laminating the cathode (2) and the anode (1) one upon another with an electrolyte holder (3) serving as a separator interposed between the cathode (2) and the anode (1). The organic electrolytic solution is permeated into the electrode group or the electrode group is immersed in the organic electrolytic solution. A porosity (40% to 80%) of the fibrous layer (A) disposed at an interface between the fibrous layer (A) and the anode (1) is set smaller than a porosity (60% to 90%) of the fibrous layer (B) disposed at an interface between the fibrous layer (B) and the cathode (2). An average porosity of the entire fibrous layer is set to not less than 50%. The fibrous layers are formed by using cellulose fibers as a main material thereof. An active substance for use in the anode (1) is a carbon material.

5 Claims, 1 Drawing Sheet

(51) Int. Cl.
*H01M 10/04* (2006.01)
*H01M 10/052* (2010.01)
*H01M 10/0566* (2010.01)
*H01M 10/0585* (2010.01)
*H01M 10/0587* (2010.01)
*H01M 4/587* (2010.01)
*H01M 10/0525* (2010.01)
*H01M 4/02* (2006.01)

(52) U.S. Cl.
CPC ......... *H01M 2/1666* (2013.01); *H01M 4/133* (2013.01); *H01M 4/587* (2013.01); *H01M 10/0431* (2013.01); *H01M 10/052* (2013.01); *H01M 10/0525* (2013.01); *H01M 10/0566* (2013.01); *H01M 10/0585* (2013.01); *H01M 10/0587* (2013.01); *H01M 2/162* (2013.01); *H01M 2/1613* (2013.01); *H01M 2004/027* (2013.01)

(58) Field of Classification Search
CPC ........... H01M 10/0587; H01M 2/1626; H01M 2/1653; H01M 2/1666; H01M 4/133; H01M 4/587
See application file for complete search history.

(56) References Cited

U.S. PATENT DOCUMENTS

| 3,228,802 | A | * | 1/1966 | Rabl | H01B 3/30 |
| | | | | | 429/145 |
| 2002/0102455 | A1 | * | 8/2002 | Daroux | B32B 27/08 |
| | | | | | 429/144 |
| 2009/0081534 | A1 | * | 3/2009 | Takami | H01M 2/1626 |
| | | | | | 429/149 |
| 2011/0223486 | A1 | * | 9/2011 | Zhang | B01D 67/0027 |
| | | | | | 429/247 |

FOREIGN PATENT DOCUMENTS

| JP | 2008-277128 A | 11/2008 |
| JP | 2009-081048 A | 4/2009 |
| JP | 2010-199083 A | 9/2010 |
| JP | 2011-233354 A | 11/2011 |
| KR | 10-2011-0119563 A | 11/2011 |
| RU | 2321922 C1 | 4/2008 |
| WO | 2006/004280 A1 | 1/2006 |

OTHER PUBLICATIONS

International Search Report in PCT/JP2012-056998 dated Jul. 10, 2012.

* cited by examiner

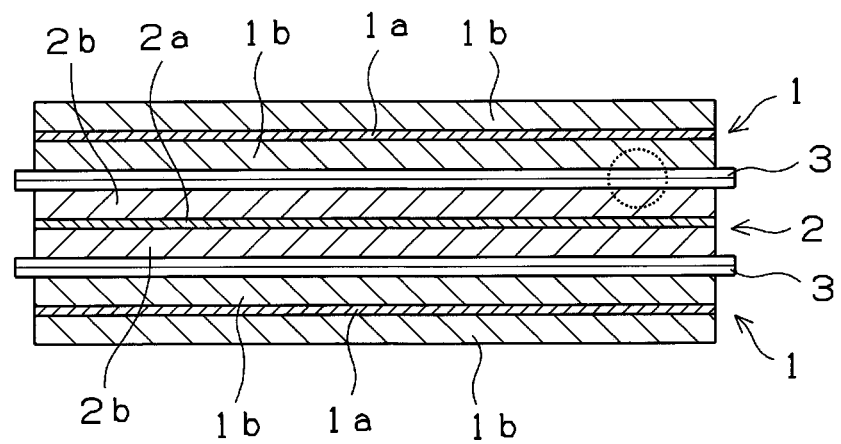
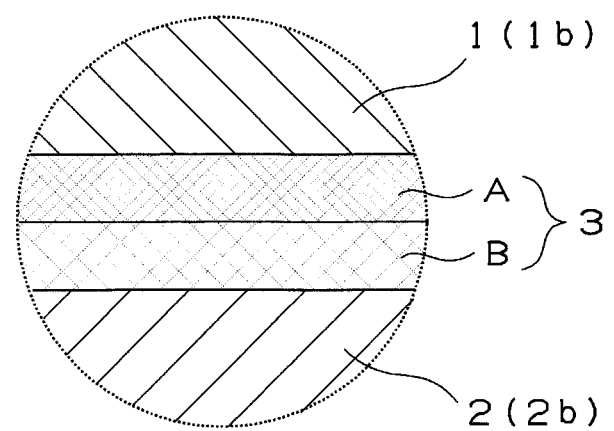

US 10,230,089 B2

ELECTROLYTE HOLDER FOR LITHIUM SECONDARY BATTERY AND LITHIUM SECONDARY BATTERY

TECHNICAL FIELD

The present invention relates to a holder for holding an electrolyte for use in a lithium secondary battery and the lithium secondary battery using the holder.

BACKGROUND ART

The lithium secondary battery formed by using a material capable of absorbing and discharging lithium ions is capable of restraining precipitation of dendrite to a higher extent than a lithium battery in which the negative electrode is formed by using metallic lithium. Therefore the lithium secondary battery has been supplied to the market as a battery having enhanced safety. In recent years, the development of the lithium secondary battery is advanced for industrial use including a case in which the lithium secondary battery is mounted on a vehicle and a case in which it is used as a stationary power source. It is a big problem to allow the lithium secondary battery to have a high output (in charging and discharging it at high current) and a long life, even though it is repeatingly charged and discharged at high current.

To overcome this problem, there have been improvements including an increase in the capacity of a positive electrode material composed of a lithium metal oxide and in the capacity of the negative electrode material composed of a carbon-based material, a material containing a titanium oxide or an alloy-based material to allow high current to flow through the lithium secondary battery. The diameters of active substance particles are decreased to increase the specific surface area of the active substance and in addition the electrodes are so designed as to increase the areas thereof so that the current density load of the lithium secondary battery can be decreased.

The above-described devices have improved the performance of the lithium secondary battery in allowing the lithium secondary battery to be charged and discharged at high current, but were insufficient as a measure for prolonging the life of the lithium secondary battery. Therefore the substitution mixing ratio of metal elements of lithium metal oxides used to form the positive electrode and substitution of doped metals have been investigated. There has been proposed an additive devised to prevent a resistance film from being generated by the decomposition of an electrolytic solution at the negative electrode composed of a carbon-based material. To improve the performance of the negative electrode composed of an alloy-based material having a semiconductor property, there has been also proposed an alloy composition, the addition of a conductive material, and a binding agent devised to restrain the volume expansion of an alloy. For example, the electrode of the secondary battery composed of the active substance powders, the electrode material formed from the carbon material and attaching to the surface of the active substance powders, and the fibrous conductive material combined with the conductive material is known (see patent document 1).

As a separator to be interposed between the cathode and the anode, a polyethylene film having a porosity of about 40% is mainly used. In addition, to improve high-temperature storage performance and output characteristics in the range from high temperatures to low temperatures, there is proposed the separator consisting of cellulose fibers heat-resistant and excellent in impregnation performance for a nonaqueous electrolyte (patent document 2).

PRIOR ART DOCUMENT

Patent Document

Patent document 1: Japanese Patent Application Laid-Open Publication No. 2008-277128
Patent document 2: Japanese Patent Application Laid-Open Publication No. 2009-81048

SUMMARY OF THE INVENTION

Problem to be Solved by the Invention

Although the above-described proposed means as disclosed in the patent document 1 are capable of increasing the cycle life up to 2000 to 3000 cycle level from hundreds of cycles, the means are insufficient for increasing the cycle life to 10 to 20 years and 10000 to 20000 cycles in the case where the lithium secondary battery is used to mount it on vehicles or stationary. In a method of relaxing the volume expansion of the alloy by increasing the adhesive force of the binding agent of the alloy-based negative electrode, there is an increase in the use amount of the binding agent when it is used as the technique of making the active substance consisting of the alloy fine and preventing the active substance from separating from the electricity collection foil. Thus a produced battery does not meet a designed capacity, and the cost increases. Thus it is difficult for the proposed means to satisfy the demanded performance to such an extent that batteries can be used for industrial application.

Of proposals hitherto made, many of them is related to the main material of the secondary battery. A certain level of effect can be expected. But examining the cause of a decrease of the life of battery and failure thereof, in many cases, it has been found that the decrease of the life of the battery is caused by a minute short circuit between electrodes and solution shortage inside the electrodes rather than the deterioration of the active substance which is the main material of the electrodes.

In the proposal disclosed in the patent document 2, the cellulose fibers excellent in its impregnation property are utilized as the separator. The separator consisting of the cellulose easily holds the electrolytic solution as compared with the separator consisting of the polyethylene film. But the separator has a single-layer construction having a constant porosity, the porosity thereof cannot be adjusted at the interface between the separator and the positive and negative electrodes in conformity to the properties of the positive and negative electrodes, and the electrolytic solution is liable to migrate to a battery can. Thereby there is a case in which solution shortage cannot be sufficiently prevented. The art disclosed in the patent document 2 assumes that the lithium titanium oxide, having a lithium ion occlusion potential of not less than 0.2V (vs. Li/Li$^+$), which is capable of preventing the precipitation of dendrite is used as the negative electrode active substance. Thus it is difficult to apply the art of the patent document 2 to a case in which a negative electrode active substance such as a carbon material is used.

The present invention has been made to cope with the above-described problems. It is an object of the present invention to provide an electrolyte holder for a lithium secondary battery capable of holding an electrolytic solution inside electrodes or at an interface between a separator and each of the electrodes, preventing solution shortage inside the electrodes, and restraining dendrite from precipitating and growing and also provide the lithium secondary battery, using the electrolyte holder, which is capable of achieving a cycle life to such an extent that the lithium secondary battery can be used for industrial application.

Means for Solving the Problem

An electrolyte holder of the present invention for use in a lithium secondary battery in which an organic electrolytic solution is permeated into an electrode group formed by winding a cathode and an anode or by laminating the cathode and the anode one upon another with the electrolyte holder serving as a separator being interposed therebetween to repeatingly occlude and discharge lithium ions, wherein the electrolyte holder consists of a multi-layer structure having at least two hydrophilic fibrous layers having different porosities; a porosity of the fibrous layer disposed at an interface between the fibrous layer and the anode is set smaller than that of the fibrous layer disposed at an interface between the fibrous layer and the cathode; and an average porosity of the entire fibrous layer is set to not less than 50%.

A porosity of a fibrous layer A constructing an interface between the fibrous layer A and the anode is set to 40% to 80%, and a porosity of a fibrous layer B constructing an interface between the fibrous layer B and the cathode is set to 60% to 90%. The electrolyte holder has (1) a two-layer structure consisting of the fibrous layer A and the fibrous layer B or (2) a three-layer structure consisting of the fibrous layer A, the fibrous layer B, and a film layer, made of synthetic resin, which is disposed between the fibrous layer A and the fibrous layer B.

The fibrous layers are formed by using cellulose fibers as a main material thereof. An active substance for use in the anode is a carbon material.

A lithium secondary battery of the present invention comprises an electrode group formed by winding a cathode and an anode or laminating the cathode and the anode one upon another with an electrolyte holder serving as a separator being interposed therebetween; and an organic electrolytic solution which permeates the electrode group or in which the electrode group is immersed to repeatingly occlude and discharge lithium ions, wherein the electrolyte holder is used for the lithium secondary battery of the present invention.

Effect of the Invention

The electrolyte holder of the present invention for the lithium secondary battery has a multi-layer structure composed of at least two hydrophilic fibrous layers having different porosities. The average porosity of the entire fibrous layer is set to not less than 50% and is thus higher than that of conventional film separators. Therefore the electrolyte holder of the present invention is capable of holding a larger amount of the electrolytic solution than the conventional film separators. In addition, the electrolyte holder of the present invention has the multi-layer structure having fibrous layers composed of different porosities. Therefore according to the properties of the active substance surfaces of the electrode plates, it is possible to appropriately set the porosities of the fibrous layers adjacent to the electrode plates. By forming the fibrous layers having the porosities according to the properties of the active substance surfaces, lithium ions are capable of easily migrating at the interface between the positive electrode and one fibrous layer and the interface between the negative electrode and the other fibrous layer, while the battery is being charged and discharged, and thus it is possible to maintain the migration state of the lithium ions at the above-described interfaces. Therefore the battery can be charged and discharged at high current, the retention amount of the electrolytic solution is unlikely to change at the above-described interfaces, the electrolytic solution little moves from the electrolyte holder to the wall of a battery can. Thus it is possible to prevent the occurrence of electrolyte shortage inside the electrodes and the above-described interfaces. Furthermore because the electrolyte holder is so constructed that the entire electrolyte holder has a high porosity and that the fibrous layer having a low porosity is disposed at the side of the anode, it is possible to restrain the metallic lithium dendrite from precipitating and growing on the surface of the negative electrode, while the battery is being charged and discharged at high current. Thereby by using the electrolyte holder as the separator, it is possible to greatly reduce the electric resistances of electrode materials, charge and discharge the battery at high current, and improve the cycle life characteristics.

BRIEF DESCRIPTION OF THE DRAWING

FIG. 1 is a sectional view showing a lithium secondary battery using an electrolyte holder of the present invention and a partly enlarged view thereof.

MODE FOR CARRYING OUT THE INVENTION

In the lithium secondary battery, it is preferable to allow the porosity of an electrolyte holder to be used as a separator to have a sufficiently high porosity in conformity to the porosity of the surface of an active substances of its positive and negative electrodes. This is to facilitate the migration of lithium ions and improve the electrolytic solution holding performance of the electrolyte holder at an interface between the electrolytic solution and each electrode. Metallic lithium dendrite will precipitate on the surface of the negative electrode. The higher the porosity of the electrolyte holder is, the more easily the dendrite precipitates and grows, which makes it easy for a short circuit to occur. In consideration of this problem, the electrolyte holder of the present invention has a high porosity as a whole and a multi-layer structure in which a fibrous layer having a low porosity is disposed at the side of an anode to restrain the precipitation and growth of the metallic lithium dendrite on the surface of the negative electrode when the lithium secondary battery is charged and discharged at high current and particularly when the lithium secondary battery is charged at high current and thereby prevent a short circuit from occurring in the battery.

The electrolyte holder of the present invention is used as the separator for the lithium secondary battery in which an organic electrolytic solution is permeated into an electrode group formed by winding the cathode and the anode or by laminating the cathode and the anode one upon another with the separator being interposed therebetween to repeatingly occlude and discharge lithium ions.

An example of the lithium secondary battery using the electrolyte holder of the present invention therefor is described below with reference to the drawings. FIG. 1 is a sectional view showing an example of the lithium secondary battery of the present invention and a partly enlarged view thereof. FIG. 1 particularly shows a sectional view of an electrode group formed by laminating the cathode, the anode, and the electrolyte holder one upon another. As shown in FIG. 1, the lithium secondary battery of the present invention has the electrode group formed by laminating an anode 1 having an anode mixed agent layer 1b and a foil-shaped anode collector 1a and a cathode 2 having a cathode mixed agent layer 2b and a foil-shaped cathode collector 2a one upon another via an electrolyte holder 3 serving as the separator. In addition to the electrode group constructed by laminating the cathode, the anode, and the electrolyte holder one upon another, the electrode group constructed by winding the anode and the cathode via the electrolyte holder is exemplified. The electrode group is immersed in the electrolytic solution inside a closed battery case (drawing is not shown).

Initially the electrolyte holder 3 is described in detail below.

The electrolyte holder consists of a multi-layer structure having at least two fibrous layers. The fibrous layers are laminated one upon another in parallel with the cathode and anode. As shown in FIG. 1, as lamination methods, in addition to lamination of layers (A, B) by directly contacting the layers (A, B) each other, the layers (A, B) may be laminated one upon another by interposing another layer such as a film layer therebetween. Each fibrous layer consists of a hydrophilic fibrous material and has a porous portion (gap between fibers) capable of holding the organic electrolytic solution therein. The fibrous material consists of nonwoven cloth formed by using a fiber material which will be described later as a material therefor or consists of paper formed by using the fiber material. The porosities of the fibrous layers are different from each other. By adopting the multi-layer structure consisting of a plurality of fibrous layers having different porosities, it is possible to appropriately set the porosities of the fibrous layers adjacent to the electrode plates according to the properties (configuration and porosity) of the surface of the active substance of each electrode plate and maintain a mobile state of lithium ions on the interface between one fibrous layer and the positive electrode and the interface between the other fibrous layer and the negative electrode while the battery is being charged and discharged.

Because a polar organic solvent is used as the solvent of the organic electrolytic solution of the lithium secondary battery, the organic electrolytic solution has a high affinity for the hydrophilic electrolyte holder. Therefore the electrolyte holder can be easily impregnated with the organic electrolytic solution and is capable of easily holding it.

The film layer is added to the fibrous layers as necessary to improve the safety of the battery by preventing a short circuit and heat generation from occurring inside the battery, when the porosities of the fibrous layers are set high. As the film layer which can be used in the present invention, a synthetic resin film consisting of polyolefin resin such as polyethylene resin and polypropylene resin are exemplified.

The thickness of the entire electrolyte holder is 20 to 100 µm. It is possible to appropriately determine the thickness of each fibrous layer constructing the electrolyte holder within a range in which the entire thickness of the entire electrolyte holder falls within the above-described range. The thicknesses of the fibrous layers may be equal to one another or different from one another.

In the electrolyte holder, the average porosity of the entire fibrous layer thereof is set to not less than 50%. By setting the porosity thereof to not less than 50%, it is possible to hold a large amount of the organic electrolytic solution at the gap between fibers of the holder and prevent the occurrence of the shortage of the organic electrolytic solution. "The average porosity of the entire fibrous layer" means an average value calculated from the porosity of each fibrous layer. The plane sizes of the fibrous layers are equal to each other, and the thicknesses of the fibrous layers can be appropriately determined. Thus in the case where the electrolyte holder consists of a first layer (porosity: X, thickness: a) and a second layer (porosity: Y, thickness: b), an average porosity $\alpha$ can be calculated based on the following equation:

$$\alpha = aX/(a+b) + bY/(a+b)$$

In the case where the thickness of the first layer is equal to that of the second layer, the average porosity $\alpha$ is as follows: $\alpha=(X+Y)/2$. In the case where the electrolyte holder consists of not less than three layers, the average porosity $\alpha$ can be calculated based on the above-described calculation method.

The porosity of each fibrous layer can be calculated as described below. A certain volume (actual volume: V, actual weight: W) is taken out of each fibrous layer to set it as a specimen. Supposing that a true density of the fiber forming the fibrous layer is A, the occupation volume of the fiber of the specimen is W/A. By subtracting the occupation volume W/A of the fiber from the actual volume of V, the volume of pores is found according to calculations. Therefore the porosity $(\%) = 100 \times (V-W/A)/V$. This can be expressed as $100 \times (1-(W/V)/A)$. Because W/V is an apparent density of the specimen, the porosity can be calculated as: the porosity $(\%) = 100 \times (1-\text{apparent density/true density of fiber})$.

The electrolyte holder is so constructed that the porosity of the fibrous layer disposed at the interface between the fibrous layer and the anode is set smaller than that of the fibrous layer disposed at the interface between the fibrous layer and the cathode. The description of "the porosity of the fibrous layer disposed at the interface between the fibrous layer and the anode is set smaller than that of the fibrous layer disposed at the interface between the fibrous layer and the cathode" means that when attention is paid to arbitrary two layers constructing the electrolyte holder, the two layers are separated into the layer forming the interface between it and the cathode and the layer forming the interface between it and the anode according to a positional relationship between the electrode plates and each fibrous layer. In this case, the porosity of the layer forming the interface between it and the anode is lower than that of the layer forming the interface between it and the cathode. That is, the porosity of the fibrous layer near to the anode is set low, whereas the porosity of the fibrous layer near to the cathode is set high. By disposing the fibrous layer having a low porosity at the side of the anode, it is possible to restrain the dendrite of the metallic lithium from precipitating and growing on the surface of the negative electrode while the battery is being charged and discharged at high current and especially when the battery is charged at high current. Consequently it is possible to prevent a short circuit from occurring inside the battery.

The porosity of each fibrous layer is so set that not less than 50% can be secured as the average porosity of the entire fibrous layer. Describing the specific range of the porosity of each fibrous layer, it is preferable to set the porosity of a fibrous layer A which is adjacent to the anode and constructs the interface between the fibrous layer A and the anode to 40% to 80% and that of a fibrous layer B which is adjacent to the cathode and constructs the interface between the fibrous layer B and the cathode to 60% to 90%. By setting the porosities of the fibrous layers A and B to the above-described range, it is possible to maintain the mobile state of the lithium ions at the interface between the fibrous layer B and the positive electrode and the interface between the fibrous layer A and the negative electrode while the battery is being charged and discharged. When the porosity of the fibrous layer A exceeds 80%, there is a fear that the precipitation and growth of the dendrite cannot be restrained. When the porosity of the fibrous layer A is less than 40%, the amount of the organic electrolytic solution to be retained thereby is smaller than that to be retained thereby when the porosity thereof is not less than 40%. Thus there is a fear that electrolyte shortage occurs in a short cycle life. It is preferable that the porosity of the fibrous layer B is high. But when the porosity thereof exceeds 90%, the fibrous layer B has a low tensile strength. Thereby the fibrous layer B cannot be practically used.

It is more favorable to set the porosity of the fibrous layer A to 50% to 60% and that of the fibrous layer B to 70% to 80%. By setting the porosity of the fibrous layer A whose porosity should be set smallest to not less than 50%, namely, by setting porosities of all the fibrous layers to not less than 50%, the electrolyte holder retains a large amount of the organic electrolytic solution and thus the occurrence of the shortage of the organic electrolytic solution can be prevented to a higher extent.

Both inorganic fibers and organic fibers may be used as a main material of the fibrous layers, provided that the inorganic and organic fibers have hydrophilic and electric insulation properties. It is possible to use non-hydrophilic fibers after subjecting the surfaces thereof to hydrophilic treatment of introducing oxygen and/or a sulfur-containing functional group (a sulfonic acid group, a sulfonate group, a sulfofluoride group, a carboxyl group, a carbonyl group) into the surfaces thereof, introducing graft-polymerized hydrophilic monomers thereinto or attaching a surface active agent to the surfaces thereof.

Examples of the inorganic fibers which can be used in the present invention include glass fibers, ceramic fibers, and the like. Examples of the organic fibers which can be used in the present invention include natural fibers such as cellulose, regenerated fibers reproduced and refined from the natural fibers, and synthetic resin fibers. Examples of materials of the synthetic resin fibers include polyester resin such as polyethylene terephthalate, polybutylene terephthalate, and polyethylene naphthalate; polyolefin resin such as polyethylene, polypropylene; copolymers thereof; polyamide resin; acrylic resin; and vinyl resin. These fibers may be used singly or in combination of not less than two kinds.

Of these materials, it is preferable to use cellulose fibers derived from natural products and especially, regenerated cellulose fibers as the main material for the fibrous layer because these fibers are hydrophilic and heat-resistant without separately treating the surfaces thereof. Materials of the cellulose fibers are not limited to specific ones, but needle-leaf kraft pulp, broad-leaf kraft pulp, Manila hemp pulp, sisal hemp pulp, bamboo pulp, esparto pulp, and cotton pulp are listed. As the regenerated cellulose fibers, regenerated cellulose fibers (polynosic rayon) having a high polymerization degree formed by using low acid solvent spinning and solvent spinning rayon formed by using an amine oxide based organic solvent are exemplified. The cellulose fibers are used after removing impurities therefrom by means of cleaning, dehydration or dust removal.

To prevent the occurrence of a short circuit, it is preferable to beat these fibers with a beater to form a high-density fibrous layer. By beating the fibers, the fibrous layer has a high density, a high tensile strength, and a high ionic permeability. When the density of the fibrous layer is too high, the gap between fibers decreases and thus a predetermined porosity cannot be maintained. Therefore the beating degree (JIS P 8121) is set to a range in which the porosity of the present invention is ensured. It is possible to use the beaten fibers and other fibers by mixing them with each other.

The fibrous layer can be produced by using the above-described fibers as its main material with a paper machine such as a fourdrinier paper machine, a tanmo machine or a cylinder paper machine. In addition, by laminating fibrous layers having different porosities one upon another with a fourdrinier-cylinder combination paper machine composed of the fourdrinier paper machine combined with the cylinder paper machine, the fibrous layers are allowed to adhere to one another with high adhesion.

To allow the structure of the electrolyte holder to restrain the precipitation and growth of the dendrite and be simple and have an excellent productivity, it is preferable to form the electrolyte holder as a two-layer structure consisting of the fibrous layer A constructing the interface between it and the anode and the fibrous layer B constructing the interface between it and the cathode (see FIG. 1) or as a three-layer structure having one synthetic resin film layer disposed between the fibrous layers A and B as necessary.

Structures of the electrodes other than that of the electrolyte holder 3 are described in detail below.

The anode 1 consists of the foil-shaped anode collector 1a and the anode mixed agent layer 1b formed on both surfaces thereof. The anode mixed agent layer 1b is formed by kneading a main material, serving as an active substance, which is capable of occluding and discharging lithium ions, a binding agent, and a dispersion solvent to form a pasty mixture and thereafter applying the pasty mixture to both surfaces of the foil-shaped anode collector 1a. As the foil-shaped anode collector 1a, a copper foil is used owing to its electrochemical property, foil shape processability, and its cost.

Examples of materials capable of occluding and discharging the lithium ions include a carbon material, a lithium-aluminum alloy, a silicon-based alloy or a tin-based lithium alloy, oxide mixtures thereof, and lithium titanate. Of these materials, it is preferable to use the carbon material because it has a small irreversible capacity. But in recent years, lithium titanate, silicon oxide, and a metallurgical silicon mixture have come to be used as materials having a high capacity.

The electrolyte holder of the present invention can be used when any negative electrode active substance is used. The use of the electrolyte holder is especially effective when an active substance used occludes lithium ions at a lithium ion occlusion potential falling in a range in which the precipitation of the dendrite of the lithium ions occurs. That is, it is preferable to apply the electrolyte holder to the case in which the active substance which occludes the lithium ions at a potential lower than a lithium ion occlusion potential of 0.2V (vs. Li/Li$^+$). As such a negative electrode active substance, a carbon material is exemplified.

The cathode 2 consists of the foil-shaped cathode collector 2a and the cathode mixed agent layer 2b formed on both surfaces thereof. The cathode mixed agent layer 2b is formed by kneading a main material, serving as an active substance, which consists of laminar or spinel-shaped lithium-containing metal oxide or solid solutions thereof, a lithium-containing metal phosphoric acid compound or a lithium-containing metal silicate, fluorides thereof or a lithium-containing compound, a binding agent, and a dispersion solvent to form a pasty mixture and thereafter applying the pasty mixture to both surfaces of the foil-shaped cathode collector 2a. As the foil-shaped cathode collector 2a, an aluminum foil is used owing to its performance.

As the laminar or spinel-shaped lithium-containing metal oxide, $LiCoO_2$, $Li(Ni/Co/Mn)O_2$, and $LiMn_2O_4$ are listed. As the solid solutions thereof, $Li_2MnO_3$—$LiMO_2$ (M=Ni, Co, Mn). As the lithium-containing metal phosphoric acid compound, $LiFePO_4$, $LiCoPO_4$, and $LiMnPO_4$ are listed. As the lithium-containing metal silicate, $LiFeSiO_4$ is exemplified. As the fluorides thereof, $Li_2FePO_4.F$ is exemplified. As the lithium-containing compound, $LiTi_2(PO_4)_3$, and $LiFeO_2$ are listed. Of these materials, it is preferable to use $LiCoO_2$, $Li(Ni/Co/Mn)O_2$, $LiMn_2O_4$, and $LiFePO_4$ are listed.

Except for the cathode collector, it is preferable to set the density of the cathode mixed agent layer 1.8 to 3.6 g/cc. Except for except the anode collector, it is preferable to set the density of the anode mixed agent layer to 1.2 to 1.7 g/cc. When the densities of both the positive and anode mixed agent layers are out of the above-described range, i.e., when the densities thereof are lower than the lower limit, the adhesiveness between the mixed agent consisting of the active substance and the current collector deteriorates. Thus there is a fear that the cyclic performance deteriorates. When the densities thereof are higher than the upper limit, the porousness of each electrode plate is not secured, and the diffusibility of the electrolytic solution is restrained. As a result, there is a fear that the performance of the battery deteriorates when the battery is charged and discharged at high current. In the case where the density of the cathode mixed agent layer and that of the anode mixed agent layer are set in the above-described range, the porosity of the anode mixed agent layer is higher than that of the cathode mixed agent layer. Thus in the electrolyte holder, it is preferable to set the porosity of the fibrous layer forming the interface between it and the negative electrode higher than that of the fibrous layer forming the interface between it and the positive electrode. In the present invention, to restrain the precipitation and growth of the dendrite of the metallic lithium, the porosity of the fibrous layer forming the interface between it and the negative electrode is set low and yet a high porosity (not less than 50%) is secured for the entire fibrous layer.

The electrolyte holder of the present invention is applicable to arbitrary positive and negative electrode materials other than the above-described ones. As an effective combination of the positive and negative electrode materials which allows the output characteristic of the lithium secondary battery to be improved, the battery to have a long life, and in addition the battery to have a high-capacity material as a small and light battery, to be mounted on vehicles, the development of which will be demanded in the future, the following combination is devised in the present invention. That is, to form the cathode mixed agent layer of the cathode, olivine type $LiPePO_4$ formed by coating a powder surface having a long life, a low cost, and a high safety with conductive carbon is used as a main material thereof. Acetylene black and carbon nanotube both of which are conductive carbon are bonded to the main material. To form the anode mixed agent layer opposed to the cathode, in consideration of a high capacity, a high regeneration, and a long life, it is most favorable to use a carbon material consisting of graphite powder, coated with conductive carbon, to which acetylene black and carbon nanotube both of which are conductive carbon are bonded. By using the electrolyte holder of the present invention as the separator between the positive electrode material combined with the negative electrode material, it is possible to restrain the precipitation and growth of the dendrite of the metallic lithium and prevent a short circuit from occurring inside the battery.

In the lithium secondary battery, as the organic electrolytic solution in which the above-described electrode group is immersed, it is preferable to use a nonaqueous electrolytic solution containing lithium salts or ionic conduction polymers.

As a nonaqueous solvent of the nonaqueous electrolytic solution containing the lithium salts, polar organic solvents are exemplified. Examples of the polar organic solvents include ethylene carbonate (EC), propylene carbonate (PC), diethyl carbonate (DEC), dimethyl carbonate (DMC), and methyl ethyl carbonate (MEC). These polar organic solvents have affinity for the hydrophilic electrolyte holder.

Examples of the lithium salts soluble in the above-described solvents include lithium hexafluorophosphate ($LiPF_6$), lithium tetrafluoroborate (($LiBF_4$), and lithium trifluoromethanesulfonate ($LiSO_3CF_3$).

In addition, the lithium secondary battery having the construction shown in FIG. 1 may be so constructed that a plurality of holes penetrating through the foil-shaped anode collector 1a and the foil-shaped cathode collector 2a is formed and that the peripheries of the holes are projected toward at least one surface of each of the foil-shaped anode and cathode collectors.

EXAMPLES

Example 1

The cathode of the lithium secondary battery was produced by a method described below.

Olivine type lithium iron phosphate, the surface of which was coated with conductive carbon whose secondary particle diameter was 2 to 3 μm was used as a positive electrode active substance. Eight parts by weight of a conductive agent consisting of a mixture of conductive carbon and conductive carbon composite and six parts by weight of a binding agent consisting of vinylidene polyfluoride were added to 86 parts by weight of the above-described active substance. As a dispersion solvent, N-methylpyrrolidone was added to the mixture of the positive electrode active substance, the conductive agent, and the binding agent. The components were kneaded to prepare a cathode mixed agent (positive electrode slurry). An aluminum foil having a thickness of 20 μm and a width of 150 mm was prepared. The positive electrode slurry was applied to both surfaces of the aluminum foil and dried. Thereafter the aluminum foil was pressed and cut to obtain the cathode for the lithium secondary battery. The total thickness of the positive electrode obtained by applying the positive electrode slurry to both surfaces of the aluminum foil, drying the positive electrode slurry, and pressing the aluminum foil was 160 μm.

Thereafter an anode for the lithium secondary battery was produced by a method described below.

Acetylene black and carbon nanotube serving as a conductive agent were added to 90 parts by weight of a carbon material (soft carbon), the surface of which was coated with carbon to obtain composite powders. As a binding agent, five parts by weight of vinylidene polyfluoride was added to 95 parts by weight of the composite powders as a binding agent. Thereafter as a dispersion solvent, N-methylpyrrolidone was added to the mixture consisting of the composite powders and the binding agent. The components were kneaded to prepare an anode mixed agent (negative electrode slurry). A copper foil having a thickness of 10 μm and a width of 150 mm was prepared. The negative electrode slurry was applied to the copper foil and dried. Thereafter the copper foil was pressed and cut to obtain the anode for the lithium secondary battery. The total thickness of the negative electrode obtained by applying the negative electrode slurry to both surfaces of the copper foil, drying the slurry, and pressing the copper foil was 120 µm.

By using the cathode and anode, a pouch type battery of 3.4V-500 mAh was produced experimentally. As a separator and an electrolyte holder interposed between the cathode and anode, two fibrous layers, made of cellulose fibers, were pasted to each other with an on-machine. One fibrous layer forming the interface between it and the positive electrode had a porosity of 80% and a thickness of 40 µm. The other fibrous layer forming the interface between it and the negative electrode had a porosity of 60% and a thickness of 40 µm. The two fibrous layers were bonded to each other by using an on-machine. Thus the obtained electrolyte holder had an average porosity of 70% and a total thickness of 80 µm. As the cellulose fibers, solvent spun regenerated cellulose fiber was used. After the cellulose fibers were beaten to a predetermined beating degree, two-layer paper was formed by using a fourdrinier-cylinder combination paper machine. The fibrous layer of the two-layer paper formed by using a fourdrinier paper machine had a porosity of 60%. The fibrous layer of the two-layer paper formed by using a cylinder paper machine had a porosity of 80%.

Comparative Example 1

A battery was experimentally produced by using the cathode and anode of the example 1 and a one-layer polyethylene film separator serving as electrolyte holder. The film separator had a thickness of 80 µm and a porosity of 40%.

Comparative Example 2

A battery similar to that of the comparative example 1 was experimentally produced by using the cathode and anode of the example 1 and a one-layer separator, consisting of cellulose fibers, which served the electrolyte holder. The separator had a thickness of 80 µm and a porosity of 45%.

Comparative Example 3

A battery similar to that of the comparative example 1 was experimentally produced by using the cathode and anode of the example 1 and a two-layer separator, consisting of cellulose fibers, which served as the electrolyte holder and had an average porosity of 40%. One fibrous layer forming the interface between it and the positive electrode had a porosity of 50% and a thickness of 40 µm. The other fibrous layer forming the interface between it and the negative electrode had a porosity of 30% and a thickness of 40 µm.

Example 2

A battery similar to that of the comparative example 1 was experimentally produced by using the cathode and anode of the example 1 and a two-layer separator, consisting of cellulose fibers, which served as the electrolyte holder and had an average porosity of 70%. One fibrous layer forming the interface between it and the positive electrode had a porosity of 80% and a thickness of 30 µm. The other fibrous layer forming the interface between it and the negative electrode had a porosity of 60% and a thickness of 30 µm.

In consideration of safety, one polyolefin film layer was interposed between the two fibrous layers and pasted thereto. The obtained separator or electrolyte holder had a total thickness of 80 µm.

The discharge capacity of each of five kinds of the batteries of the example 1 and 2 and the comparative examples 1 through 3 was measured by flowing constant currents of 0.5 A and 15 A therethrough until the voltage thereof dropped to 2.0V to calculate the ratio of the discharge capacity of each battery when it was discharged at 15 A to the discharge capacity thereof when it was discharged at 0.5 A. After each battery was charged at 50%, it was discharged at 0.1 A, 0.5 A, 1 A, 1.5 A, and 2.5 A for 10 seconds from the time when the circuit was opened to measure the voltage thereof after the lapse of 10 seconds. Based on an I-V characteristic line obtained by plotting the relationship between a current value with respect to a voltage drop from an open circuit voltage when discharge current flowed through each battery, the slopes of the lines were found by using a least-squares method to obtain DC resistance values when the batteries were charged at 50%. The obtained values of the slopes of the lines, namely, the obtained DC resistance values were compared with one another.

By using the five kinds of the batteries, a cycle life test was conducted at 25 degrees C. In a discharge and charge condition in which each battery was discharged at 1.5 A (4.0 to 2.0V) and charged at a constant current of 1.5 A and a constant voltage of 4.0V (charging finished at 0.025 A). Suspension was taken for 10 minutes between the charging and discharging operations. The life of each battery was determined in terms of a cycle number at which the discharge capacity thereof reached 70% of an initial capacity thereof. The results of the charge and discharge test are shown in tables 1 through 3 shown below.

TABLE 1

Results of comparison of ratio of discharge capacity at 15 A to discharge capacity at 0.5 A

| Battery number | Ratio between discharge capacities (%) |
|---|---|
| Comparative example 1 | 15 |
| Comparative example 2 | 21 |
| Comparative example 3 | 68 |
| Example 1 | 55 |
| Example 2 | 42 |

TABLE 2

Results of comparison among DC resistances when batteries were charged at 50%

| Battery number | DC resistance (mΩ) |
|---|---|
| Comparative example 1 | 74 |
| Comparative example 2 | 62 |
| Comparative example 3 | 20 |
| Example 1 | 46 |
| Example 2 | 51 |

TABLE 3

Results of cycle life test in which
batteries were charged and discharged

| Battery number | Cycle number when discharge capacity reached 70% |
|---|---|
| Comparative example 1 | 1700 |
| Comparative example 2 | 4500 |
| Comparative example 3 | 5900 |
| Example 1 | 16000 |
| Example 2 | 14000 |

As shown in tables 1 through 3, by using the electrolyte holder of the present invention, it is possible to provide batteries to be mounted on vehicles or stationary batteries which have a low electric resistance, a high output, and a long life. It is considered that this is attributable to an abundant electrolytic solution secured by the hydrophilic fibrous electrolyte holder at the interface between one fibrous layer and the positive electrode and the interface between the other fibrous layer and the negative electrode and thereby the state of ionic migration of the lithium ions at the interfaces is maintained for a long time.

An overcharge safety test was conducted. As the test method, smoke emission, ignition, and the temperature rise of each battery were examined when a full charge state was changed to a 300% overcharge state with each battery being hung in air inside a constant temperature bath. Table 4 shows the results.

TABLE 4

Results of overcharge safety test

| Battery number | State when batteries were overcharged by 300% |
|---|---|
| Comparative example 1 | Smoke emission occurred. |
| Comparative example 2 | No smoke emission nor ignition occurred. Temperature: 80 degrees C. |
| Comparative example 3 | No smoke emission nor ignition occurred. Temperature: 50 degrees C. |
| Example 1 | No smoke emission nor ignition occurred. Temperature: 50 degrees C. |
| Example 2 | No smoke emission nor ignition occurred. Temperature: 40 degrees C. |

In the battery using a conventional film separator (comparative example 1) consisting of polyethylene, the positive electrode consisted of $LiFePO_4$. Thus ignition did not occur. But smoke emission partly occurred owing to the precipitation of the dendrite of the metallic lithium at the negative electrode. On the other hand, in any of the fibrous electrolyte holders, no ignition or smoke emission occurred. It has been found that heat generation caused by the precipitation of the dendrite and by the decomposition of the electrolytic solution was restrained to a higher extent in the fibrous electrolyte holders of the examples of the present invention than in the electrolyte holder of the comparative example 2 having a low porosity. In the fibrous electrolyte holder of the example 2 having the film layer interposed between the two fibrous layers, the film restrained the precipitation of the dendrite and heat generation to a higher extent. It is conceivable that the fibrous electrolyte holder allowed a larger amount of the electrolyte solution to permeate thereinto than the separator made of the film and thus the electrolytic solution to have an improved heat conduction, which restrained heat generation.

INDUSTRIAL APPLICABILITY

The lithium secondary battery using the electrolyte holder of the present invention can be repeatedly charged and discharged at high current and has a cycle life of 10000 to 20000 and a service life of 10 to 20 years and thus can be used in industrial applications. For example, the lithium secondary battery of the present invention can be mounted on vehicles and used as a stationary type.

EXPLANATION OF REFERENCE SYMBOLS
AND NUMERALS

1: anode
1a: anode collector
1b: anode mixed agent layer
2: cathode
2a: cathode collector
2b: cathode mixed agent layer
3: electrolyte holder

The invention claimed is:

1. An electrolyte holder for use in a lithium secondary battery in which an organic electrolytic solution is permeated or immersed into an electrode group formed by winding a cathode and an anode or by laminating said cathode and said anode one upon another with said electrolyte holder serving as a separator being interposed therebetween to repeatingly occlude and discharge lithium ions, wherein said electrolyte holder consists of a paper structure having two hydrophilic regenerated cellulose fibrous layers which have different porosities, where said regenerated fibrous layers are derived from natural products without separately treating the surfaces thereof said hydrophilic regenerated cellulose fibrous layers consisting of paper obtained after beating regenerated cellulose fibers;

a porosity of a fibrous layer A disposed at an interface between said fibrous layer and said anode is set smaller than that of a fibrous layer B disposed at an interface between said fibrous layer and said cathode;

a porosity of said fibrous layer A is set to 50% to 60% and a porosity of said fibrous layer B is set to 70% to 80%; and an average porosity of said entire fibrous layer is set to not less than 50%, said organic electrolyte solution being a nonaqueous electrolytic solution containing lithium salts.

2. The electrolyte holder for use in a lithium secondary battery according to claim 1, wherein said multi-layer structure is formed by laminating fibrous layers having different porosities.

3. The electrolyte holder for use in a lithium secondary battery according to claim 1, wherein an active substance for use in said anode is a carbon material.

4. The electrolyte holder for use in a lithium secondary battery according to claim 1, wherein said electrolyte holder has a two-layer structure consisting of said fibrous layer A and said fibrous layer B.

5. A lithium secondary battery comprising an electrode group formed by winding a cathode and an anode or laminating said cathode and said anode one upon another with an electrolyte holder serving as a separator being interposed therebetween; and an organic electrolytic solution which permeates said electrode group or in which said electrode group is immersed to repeatingly occlude and discharge lithium ions, wherein said electrolyte holder is an electrolyte holder, for a lithium secondary battery, according to claim 1.

* * * * *